United States Patent
Honda

(10) Patent No.: US 6,498,789 B1
(45) Date of Patent: Dec. 24, 2002

(54) CDMA MOBILE COMMUNICATIONS DEVICE

(75) Inventor: Shoichiro Honda, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/207,718

(22) Filed: Dec. 9, 1998

(30) Foreign Application Priority Data

Dec. 15, 1997 (JP) .............................. 9-362493

(51) Int. Cl.[7] .......................... H04J 13/00; H04B 1/707
(52) U.S. Cl. ......................... 370/342; 370/335; 375/236
(58) Field of Search ................................. 370/320, 328, 370/334, 335, 342, 441, 479, 515; 375/236

(56) References Cited

U.S. PATENT DOCUMENTS 5,550,811 A * 8/1996 Kaku et al. ................. 370/342
5,796,776 A * 8/1998 Lomp et al. ................ 375/222
5,867,527 A * 2/1999 Ziv et al. .................... 375/208
6,091,703 A * 7/2000 Saunders et al. ........... 370/210

FOREIGN PATENT DOCUMENTS

| EP | 838 910 A2 | 4/1998 |
| EP | 852 430 A2 | 7/1998 |
| GB | 2 302 782 A | 1/1997 |
| GB | 2 329 307 A | 3/1999 |

* cited by examiner

Primary Examiner—Hassan Kizou
Assistant Examiner—Ahmed Elallam
(74) Attorney, Agent, or Firm—Pearne & Gordon LLP

(57) ABSTRACT

In a CDMA mobile communications device, a long code generator can be eliminated from a receiving section by storing a received long code at an output timing of a decimating section 11 through calculation of a write address of a FIFO buffer 12a, calculating a read address of the FIFO buffer at the cycle of a reference clock signal output from a reference clock signal generation section 12c, controlling the received long code through use of a FIFO buffer control section 12b which reads the received long code, and by a symbol combining section 10 combining symbols received over paths and output from a RAKE receiving section at the cycle of the reference clock signal and demodulating the combined symbol through use of the received long code.

17 Claims, 6 Drawing Sheets

CDMA MOBILE COMMUNICATIONS DEVICE

BACKGROUND OF THE INVENTION

The present invention relates to a code division multiple access (hereinafter referred to simply as a "CDMA") system employing a spread spectrum (SS) communication scheme in the field of mobile communication.

Since spread spectrum communication employed in the field of mobile communication permits code division multiple access and has superior noise resistance, the spread spectrum communication is used for a CDMA communications system or radio LAN communications. A CMDA communications system is currently in actual use in North America and Korea (hereinafter referred to as a "North American Scheme") and is standardized as (TIA/EIA/IS95 and TIA/EIA/IS98) scheduled to be put into service by Japanese communication service companies. Further, another CDMA scheme is scheduled to be adopted in Japan as a third-generation mobile communications scheme (hereinafter referred to simply as a "wideband scheme").

A spread spectrum scheme comprises a spread spectrum direct sequence (direct spread spectrum) scheme and a spread spectrum frequency hopping scheme. All currently employed as CDMA schemes are direct sequence schemes. In a spread spectrum communications scheme, multipath components are combined at the maximum rate through use of a receiver called a RAKE system, thereby producing a diversity effect. The RAKE receiver is described in, e.g., U.S. Pat. No. 5,109,390.

Use of the RAKE receiver complying with the CDMA scheme enables a mobile communications device to communicate with base station other than the base station with which the device is currently communicating, thus allowing a hand-off without interruption of communication (i.e., a soft hand-off).

In order to realize a soft hand-off, the North American scheme causes all the base stations to be in synchronization with one another through use of the Global Positioning System (GPS). In the wideband scheme, the base stations are not in synchronization with one another. Accordingly, the North American scheme enables easier detection of a base station for soft hand-off purpose. In the North American scheme, all base stations share a common code (e.g., a long code), and the base stations are brought into synchronization with one another by activating a generator for producing the common code through use of a GPS clock signal.

FIG. 6 shows the configuration of a mobile communications device complying with the North American scheme. The mobile communications device shown in FIG. 6 is roughly divided into a transmission section A and a receiving section B. The transmission section A comprises a transmission data preparation section 1; an error detection/correction encoding section 2; a long code generator 3; a long code modulation section 4 which performs a first spreading operation through use of the long code; an in-phase component direct sequence section 5 which directly spreads a long code modulation signal through use of a spread code of an in-phase component; a quadrature component direct sequence section 6 which directly spreads a long code modulation signal through use of a spread code of a quadrature component; and a radio transmission section 7 which converts the frequency of a directly-spread base band signal into a radio frequency band, amplifies the signal, and transmits the signal from an antenna.

The receiving section B comprises a radio receiving section 8 which receives a signal of radio frequency band by way of an antenna, amplifies the signal, and converts the frequency of the received signal into a base band range; a RAKE receiving section 9 which combines multipath components at the maximum rate and effects a soft hand-off; a symbol combining section 10 which combines a received symbol at the maximum rate; the long code generator 3 that is identical in configuration with that provided in the transmission section A; a decimating section 11 which decimates the long code; a long code demodulation section 13 which descrambles the long code through use of the decimated long code; an error detection/correction decoding section 14; and a demodulation data processing section 15 which segments the decoded received data into an audio signal and a control signal. The RAKE receiving section 9 comprises in-phase component despread sections 9a to 9c; quadrature component despread sections 9d to 9f; and combining sections 9g to 9i. In-phase components and quadrature components are despread and combined for every path, whereby a despread signal (i.e., a received symbol) is output for every path.

In the existing mobile communications device complying with the North American scheme, the mobile communications device produces at different timings, a long code for transmission purpose and a long code for receiving purpose. Therefore, as shown in FIG. 6, the communications device requires separate long code generators for transmission and receiving purposes. The reason for this will now be described. FIG. 7 shows the configuration of a long code generator used in the existing North American scheme mobile communications device. As shown in FIG. 7, the long code generator comprises 42 flip-flops, XOR circuits provided for all the outputs of the flip-flops, and seven XOR circuits necessary for feed-back operations (dividing operations) of a shift register (42 AND circuits are also required if a long code masking operation is performed). A clock frequency of 1.228 MHz is used as a clock signal for the long code generator.

In a North American scheme mobile communications device, an output from the long code generator 3 of the transmission section is used as a long code for the receiving section while being decimated. In the mobile communications device, a transmission timing is matched with the fastest path by means of the antenna's edge according to the North American standards. The transmission timing is usually faster than the receiving timing because of a delay in the radio section and a delay for multipath combining (or a difference in timing between the fastest path and the slowest path), thereby posing no problem. However, the transmission timing is sometimes delayed (see EIA/TIA/IS-95A), and hence the receiving timing may become faster than the transmission timing, thereby posing a problem. The mobile communication device receives from the base station a string of long codes having a certain absolute time interval. From that point on, the mobile communications device produces a long code through use of a clock signal in synchronization with the base station. Accordingly, the mobile communication device cannot hold a string of long codes prior to receipt of a string of long codes from the base station. Accordingly, if the receiving timing becomes faster than the transmission timing, the receiving section cannot receive the long code from the transmission section. The despread timing of the RAKE receiving section of the receiver changes every time a receiving path changes, thereby making it difficult to adjust the transmission and receiving timings.

For this reason, the receiver is required to have a long code generator which operates at a timing independent of the transmission section and is identical with the long code generator of the transmission section (see the configuration of the long code generator shown in FIG. 6). For this reason, the mobile communications device becomes larger in scale, and an electric current dissipated in the communications device is increased.

Under the North American standards, the symbol combining section 10 is required to combine a delay path spreading over a cycle of several symbols without involvement of phase shift. Paths used for combining symbols are frequently switched in order to improve a receiving performance. If the receiving timing of each path frequently changes over a cycle of several symbols, the delay path cannot be combined without involvement of phase shift. For this reason, the configuration of the symbol combining section 10 becomes complicated.

SUMMARY OF THE INVENTION

The present invention is aimed at solving the foregoing problem of the existing CDMA mobile communications device, and the object of the present invention is to provide a superior CDMA mobile communications device which can be made compact and can reduce an electric current to be dissipated by means of a reduction in the number of receiving long code generators caused by storing long codes—which are previously produced by a transmission section in at least a number corresponding to the maximum timing difference—into a buffer before a receiving timing becomes faster than a transmission timing, and by reading the long code as a received long code.

Another object of the present invention is to provide a superior CDMA mobile communications device which can combine a delay path spreading over a cycle of several symbols with a simple configuration and without involvement of phase shift, by calculation of write and read addresses of a first-in-first-out (FIFO) buffer which stores a despread output symbol of each path, and through use of a reference clock generator, a counter which is incremented every time each path produces a despread output, and a differential signal generator for producing a difference between a previous count value and a current count value.

To solve the foregoing problem, a CDMA mobile communications device according to the present invention comprises: a buffer which decimates an output from a long code generator to be used in a transmission section and stores the thus-decimated long code; a buffer control section which controls addresses for writing and reading the buffer; and a long code demodulator which processes the long code (received long code) output from the buffer and a received signal (received symbol) output from a RAKE receiving section by means of a XOR operation.

A CDMA mobile communications device according to the present invention comprises: a RAKE receiving section which separates a received signal for each transmission path, despreads the thus-separated signal components for each in-phase and for each quadrature component through a spread string and merges the components into a combination signal, and outputs the combination signal for each path; first-in-first-out (FIFO) buffers which store outputs (received symbol) from the RAKE receiving section for individual paths; a counter which is incremented at every output timing (or dump clock) for each path of the RAKE receiving section and whose maximum value is equivalent to the maximum number of received symbols to be stored in the FIFO buffer; a reference clock signal generator for outputting a clock (or reference clock) signal which runs at the cycle of the received symbol; a FIFO buffer control section which stores the received symbol into each of the FIFO buffers for every reference clock signal by referring to an output from the counter provided for each path as a write relative address and reads the read relative addresses of all the FIFO buffers from an identical count value; and a symbol combining section which merges the outputs from the FIFO buffers into one symbol.

With the foregoing configuration, before the receiving timing become faster than the transmission timing, the long code previously received by the transmission section is stored in the buffer in a number corresponding to the maximum timing difference. The thus-stored long code is read as a received long code from the buffer, thereby eliminating a received long code generator. As a result, there is obtained a superior CDMA mobile communications device which can be made compact and can reduce an electric current to be dissipated.

Further, there are provided a plurality of FIFO buffers for storing despread output symbols for individual paths. A write address of the FIFO buffer is calculated through use of a reference clock signal generator, and a read address of the FIFO buffer is calculated through use of a reference clock signal generator, a counter which is incremented for an output from each path, and a differential signal generator which produces a difference between the previous count value and the current count value. As a result, there is obtained a superior CDMA mobile communications device which can combine a delay path without involvement of phase shift and with a simple configuration.

Specifically, according to the first aspect of the present invention, a CDMA mobile communications device comprises: a transmission section including a transmission data preparation section, an encoding section for detecting and correcting an error, a long cycle string code (long code) generator used for primary spreading operations, a long code modulator which processes the long code and an output from the encoding section by means of an exclusive OR operation; a short code spreader which divides an output from the long code modulator into in-phase components and quadrature components and processes the components by means of secondary spread through use of a short cycle string code (short code), a frequency conversion section which converts the frequency of an output from the short code spreader into a radio frequency range, an amplifier for amplifying the thus-frequency-converted signal, and an antenna; and a receiving section including a radio receiving section for converting a signal received by an antenna into a signal of base band range, a RAKE receiving section which separates an output from the radio receiving section for each transmission path and despreads the thus-separated outputs for each in-phase component and for each quadrature component by means of despreading operations through use of the short code, a symbol combining section which combines outputs from the RAKE receiving section, a buffer which decimates the output from the long code generator of the transmission section and stores the thus-removed long codes, a buffer control section which controls read and write addresses of the buffer, a long code demodulator which processes the long code (received long code) output from the buffer and the received signal (received symbol) output from the symbol combining section by means of exclusive OR operations, a reference clock signal generator for producing a clock signal which runs at the cycle of the received symbol, an error detection-and-correction section which reproduces received data by detection and correction of an error in the symbol output from the long code demodulator, and a demodulated data processing section which decomposes the reproduced data into a sound signal and a control signal. The CDMA mobile communications device enables data transmission of audio and control data according to a CDMA scheme without use of a received long code generator and can be made compact.

Further, according to second aspect of the present invention, the buffer previously stores the received long code in at least a number corresponding to the maximum amount of delay before a transmission timing of the transmission section lags. The device can supply a received long code even when the transmission timing becomes lagged.

Further, according to the third aspect of the present inveniton, a CDMA mobile communications device comprises: a long cycle string code (long code) generator to be used in primary spreading operations for transmission; a decimating section for decimating an output from the long code generator; a first-in-first-out (FIFO) buffer for storing an output (received long code) from the decimating section; a reference clock signal generator for producing a clock (reference clock) signal which runs at the cycle of a despread received signal (received symbol); a first counter which is incremented at the output timing (or dump clock timing) of the decimating section; a second counter which is incremented at the reference clock cycle; and a long code operation section which processes the output from the FIFO buffer and the despread received signal. The CDMA mobile communications device enables data transmission of audio and control data according to a CDMA scheme without use of a received long code generator and can be made compact.

According to fourth aspect of the present invention, modulo values of the first and second counters are taken as the maximum number of long codes which the FIFO buffer can store, and wherein the output from the first counter is referred to as a write address of the FIFO buffer every output timing (dump clock timing), and the output from the second counter is referred to as a read address of the FIFO buffer every reference clock signal. The device enables transmission according to a CDMA scheme without use of a received long code generator and with a simple configuration and can be made compact.

According to fifth aspect of the present invention, a CDMA mobile communications device comprises: a long cycle string code (long code) generator to be used in primary spreading operations for transmission; a reference clock signal generator for producing a clock (reference clock) signal which runs at the cycle of a despread received signal (received symbol); a decimating section for decimating an output from the long code generator; a shift register which stores the long code (received long code) while shifting the long code each timing (dump clock timing) at which the decimating section produces an output; a counter which is incremented at every dump clock timing and is reset at the reference clock cycle; an integrator which integrates the count value, outputs an integral value, and is decremented after outputting of the integral value; and a long code operation section which reads the received long code of the shift register from the position corresponding to the value output from the integrator and processes the received long code and a despread received signal by means of exclusive OR operations. The CDMA mobile communications device enables data transmission of audio and control data according to a CDMA scheme without use of a received long code generator and can be made compact.

According to the sixth aspect of the present invention, a CDMA mobile communications device comprises: a radio receiving section for converting a signal received by an antenna into a signal of base band range; a RAKE receiving section which separates an output from the radio receiving section for each transmission path and despreads the thus-separated outputs for each in-phase component and for each quadrature component by means of despreading operations through use of the short code; a plurality of buffers which store outputs from the RAKE receiving section for respective paths; a symbol combining section which combines outputs from the buffers; a buffer control section which calculates write and addresses of each buffer on the basis of information about the timing of the signal for each path received from the RAKE receiving section in order to prevent phase shift among the outputs from the buffers at the time of combining of a symbol; a long cycle string code (long code) generator; a decimateing section which decimates an output from the long code generator; a long code demodulator which processes an output (received long code) from the decimating section and an output (received symbol) output from the symbol combining section by means of exclusive OR operations; an error detection-and-correction section which reproduces received data by detection and correction of an error in the symbol output from the long code demodulator; and a demodulated data processing section which decomposes the reproduced data into a sound signal and a control signal. The device can combine RAKE received output signals of each path without phase shift.

Furthermore, according to the seventh aspect of the present invention, the plurality of buffers comprise a plurality of first-in-first-out (FIFO) buffers which store outputs (received symbols) from the RAKE receiving section for each of the paths; and wherein the buffer control section comprises a plurality of first counters which are incremented at every output timing (dump clock timing) for each of the paths of the RAKE receiving section and whose maximum value is equivalent to the maximum number of received symbols to be stored in each FIFO buffer; a reference clock signal generator for producing a clock (reference clock) signal running at the cycle of the received symbol; a second counter which is referred to as a relative address of each FIFO buffer and whose maximum value is equal to the maximum number of symbols to be stored in each FIFO buffer; and a FIFO buffer control section which stores received symbols into the individual FIFO buffers while, for every reference clock signal, referring to outputs from the plurality of first counters as write addresses and which refers to all the relative read addresses of the FIFO buffers as an identical count value of the second counter. There can be simplified the configuration for symbol combining operations in which the RAKE receiver output signal for each path is combined without involvement of phase shift.

According to the eighth aspect of the present invention, the FIFO buffer control section comprises: a switch for selecting a count value (the fastest count value) corresponding to the fastest path (a receiving path over which a signal arrives at the fastest speed); a delay device which delays the fastest count value for one cycle of the reference clock signal; a differential signal generator which produces a signal relating to a difference between the output from the switch and the output from the delay device; a FIFO buffer output symbol number calculation section which calculates from the output from the differential signal generator the number of symbols output from each FIFO buffer; and a FIFO buffer read address calculation section for incrementing the count value of the second counter referred to at the time of calculation of the read address, after each FIFO buffer has been read. There can be simplified the configuration for symbol combining operations in which the RAKE receiver output signal for each path is combined without involvement of phase shift.

The above mentioned inventions can be applied to a CDMA mobile communications base station or a CDMA receiving method. Therefore, the devices operate in the same way as those mentioned above.

DETAILED DESCRIPTION OF THE PREFERRED EMBODIMENTS

Embodiments of the present invention will now be described by reference to FIGS. 1 through 5.

First Embodiment

Figure 1:
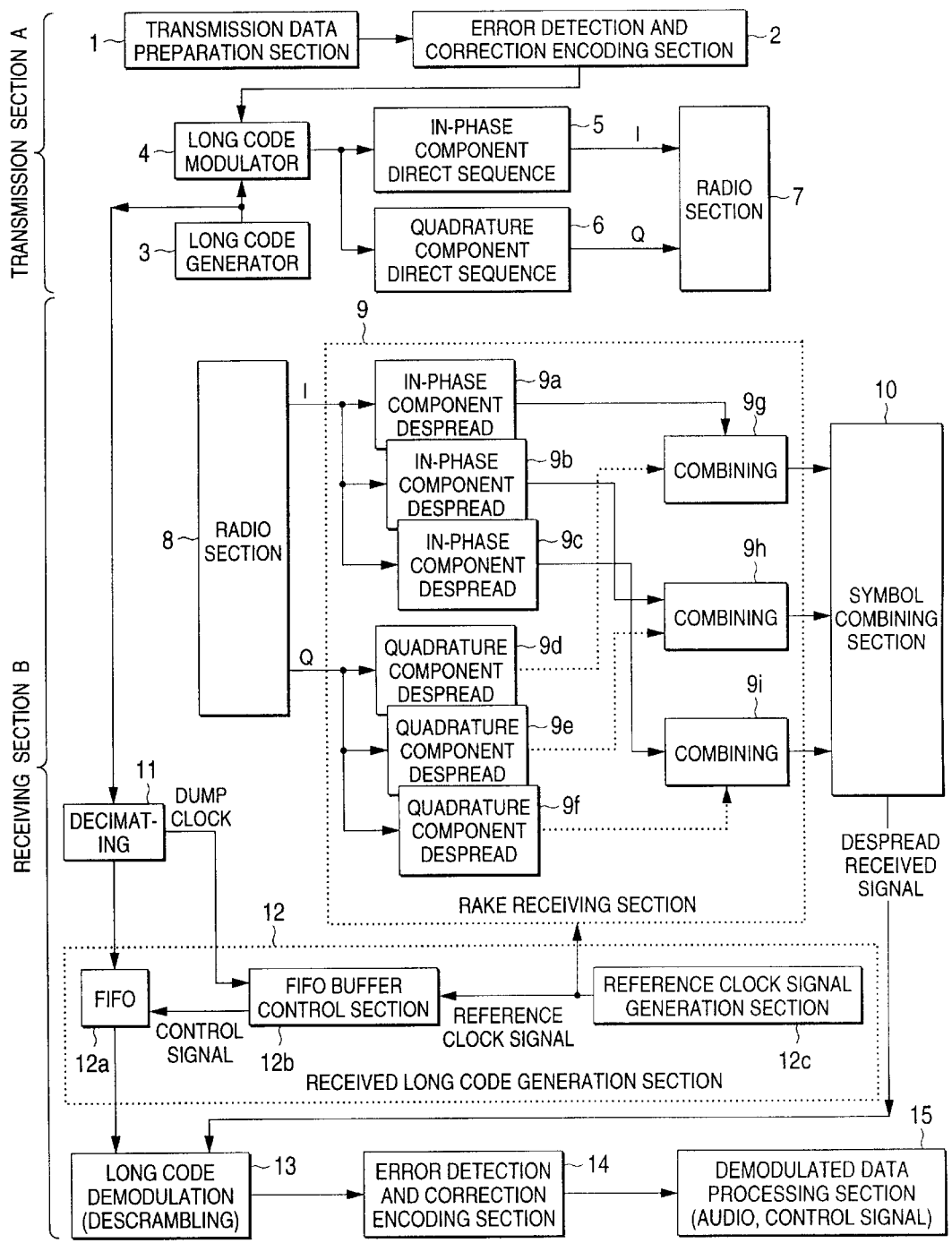
FIG. 1 is a block diagram showing the configuration of a CDMA mobile communications device according to a first embodiment of the present invention.

FIG. 1 is a block diagram showing a CDMA mobile communication device. In FIG. 1, a CDMA mobile communications device is roughly constituted of a transmission section A and a receiving section B. The transmission section A comprises a transmission data preparation section 1 which prepares transmission data such as audio and control data; a CRC encoding section for performing an encoding operation to be used for detecting and correcting an error; an error detection and error correction encoding section 2 including a convolution encoder and an interleaving section; a shift register for producing a transmission long code; a long code generator 3 including an XOR circuit and an AND circuit for masking purposes; a long code modulator 4 which modulates encoded data through use of long codes and includes an XOR circuit; an in-phase component direct sequence section 5 which includes a spread code generator, separates the long-code-modulated data into in-phase components, and spreads the in-phase components through use of a spread code; an orthogonal component direct sequence section 6 which includes a spread (XOR) processing section, separates the long-code-modulated data into orthogonal components, and spreads the orthogonal components through use of a spread code; and a radio transmission section 7 which transmits the spread in-phase signal and the spread orthogonal signal in the form of a signal of radio frequency band and includes a frequency converter, an amplifier, a filter, a local oscillator, and an antenna.

The receiving section B comprises a radio receiving section 8 which converts a received signal of radio frequency band into a base band range and includes an antenna, a local oscillator, a filter, an amplifier, and a frequency converter; a RAKE receiving section 9 which despreads the received signal of base band range into in-phase components and orthogonal components for each path, generates a received symbol by combining of the in-phase and orthogonal signals despread for each path, and includes for each path a spread code generator for in-phase components, a spread code generator for orthogonal components, a despread (XOR) processing section, and a combining section; a symbol combining section 10 which combines symbols received over the paths and includes an adder; a decimating section 11 including a switch which is turned on or off at the clock cycle of a received long code decimated from the transmission long code in order to extract the received long code from the long code generated by the transmission section A; a FIFO buffer control section which adjusts a timing difference between the received symbol and the received long code and controls a FIFO buffer for storing the received long code and read and write addresses of the FIFO buffer; a received long code generation section 12 which includes a reference clock signal generation section for generating a reference clock signal used as a timing standard for demodulating a long code through use of the received symbol and the received long code; a received long code demodulation section 13 which demodulates the received signal into a long code at the cycle of the reference clock signal and includes an XOR processing section; an error detection and correction decoding section 14 which reproduces received data by detection and correction of an error in the received symbol and includes a reverse interleaving section, a Viterbi decoder, and a CRC decoder; and a demodulated data processing section 15 which decomposes the demodulated data into audio and control signals and includes a header detection section and a frame decomposition section.

In the CDMA mobile communications device having the foregoing configuration, a received long code is stored into the FIFO buffer at every output timing (dump clock timing). A long code is demodulated by reading from respective FIFO buffers the received symbol and the received long code, both of which are combined at every reference clock signal. The write and read addresses are updated every time read and write operations are performed. Further, before the transmission timing is delayed, the long receiving code is stored beforehand in at least a number corresponding to the maximum amount of delay.

By means of the reference clock signals respectively for transmission and receiving purposes, the transmission operation and the receiving operation can be carried out at independent timings. Further, even if the transmission timing lags, since the received long code is already stored in the FIFO buffer, the long code demodulation operation can be carried out. Accordingly, the first embodiment of the present invention eliminates the necessity of a received long code generator, thereby rendering the CDMA mobile communications device compact and reducing an electric current to be dissipated.

Second Embodiment

Figure 2:
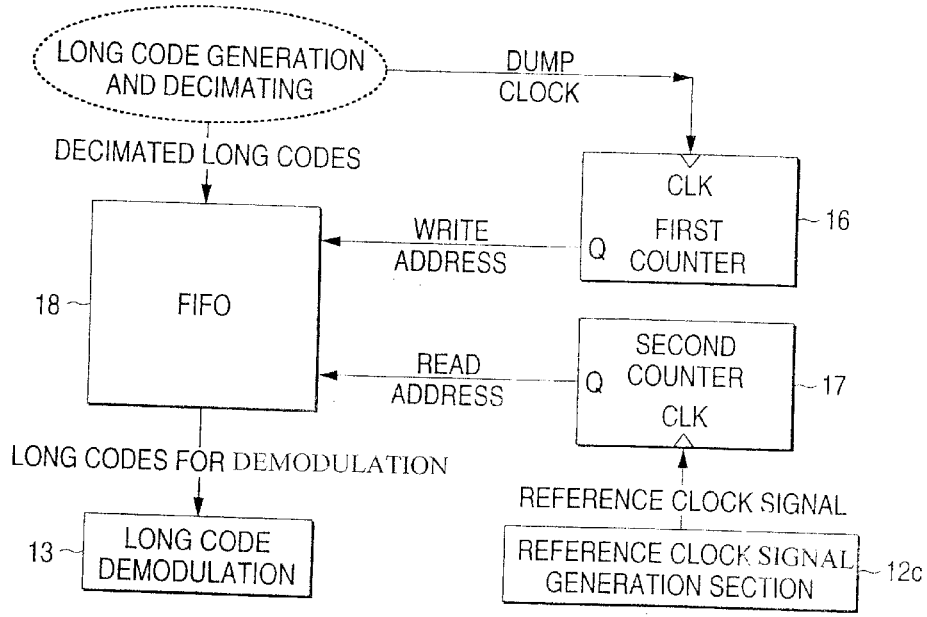
FIG. 2 is a block diagram showing the configuration of a first received long code generation section which more specifically embodies a received long code generation section according to a second embodiment of the present invention.

FIG. 2 shows the configuration of a first received long code generation section which more specifically embodies the received long code generation section 12 shown in FIG. 1. In FIG. 2, the first received long code generation section comprises a first counter 16 which calculates a write address of the FIFO buffer and has the maximum number of long codes to be stored in the FIFO buffer as a modulo value; a second counter 17 which calculates a read address of the FIFO buffer and has the maximum number of long codes to be stored in the FIFO buffer as a modulo value; a reference clock signal generation section 12c which produces a reference clock signal to be imparted to the second counter 17; and a FIFO buffer 18 for storing the received long codes. Further, in relation to the first received long code generation section, FIG. 2 shows the received long code demodulation section 13 which demodulates a long code by processing the received symbol and the received long code through an XOR operation.

In the received long code generation section having the foregoing configuration, the first counter is incremented at every dump clock signal, and the received long code is written into the FIFO buffer by referring to the value of the counter as a relative write address. The second counter is incremented at every reference clock signal, and the received long code is read from the FIFO buffer by referring to the value of the counter as a relative read address. Implementation of the received long code generation section involves eight bi-directional buffers, one eight-bit register, two three-bit counters, and two three-bit multiplexers for decoding purposes.

Under the North American CDMA scheme, the maximum transmission delay time is eight times the cycle of the received symbol. The transmission timing follows the timing of the fastest receiving path. The lag difference to be compensated for between the fastest path and the slowest path is three times or more the cycle of the received symbol under the North American CDMA scheme. Accordingly, to compensate for a lag in the slowest receiving path, the combination of symbols received over the paths lags several symbols behind the transmission timing. Therefore, even if there is taken into account of the dump clock signal being not synchronous with the reference clock signal, sufficient storage capacity for the FIFO buffer is a cycle of eight symbols corresponding to the maximum transmission delay time. Address decoders for transmission and reception are each three bits.

Figure 7:
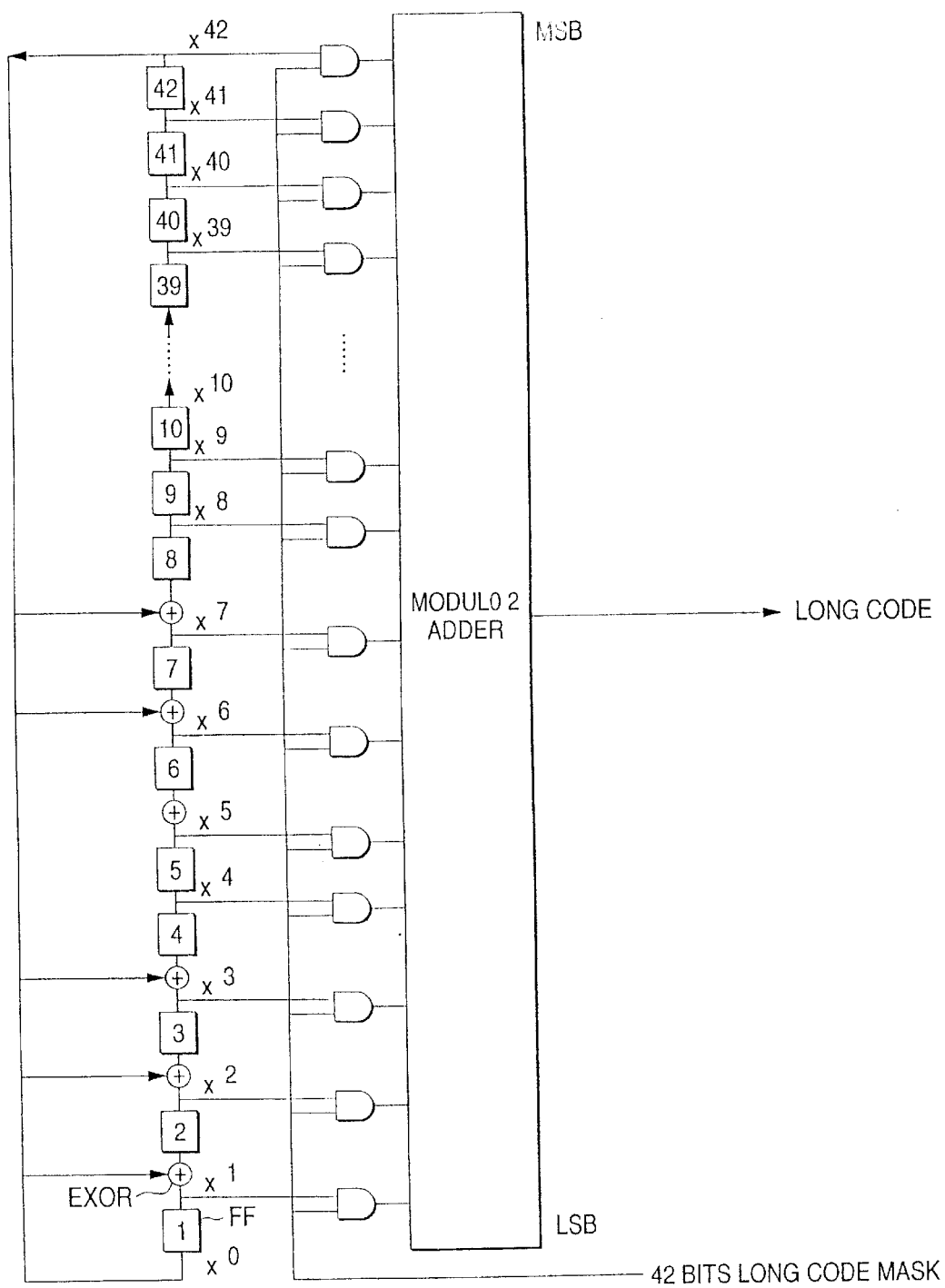
FIG. 7 shows the configuration of a long code generator used in the existing North American scheme mobile communications device.

The long code generator requires 42 flip-flops, XOR circuits provided for all the flip-flops, and seven XOR circuits required for feedback operations of the shift registers (i.e., dividing operations) (see FIG. 7 and Table 1, which will be described later). The clock cycle of the long code generator is 1.228 MHz, and the clock cycle of the reference clock signal and that of the dump clock signal used by the received long code section shown in FIG. 2 is 19.2 KHz. Therefore, according to the second embodiment, the CDMA mobile communications device can be rendered compact, and the electric current to be dissipated can be reduced.

Third Embodiment

Figure 3:
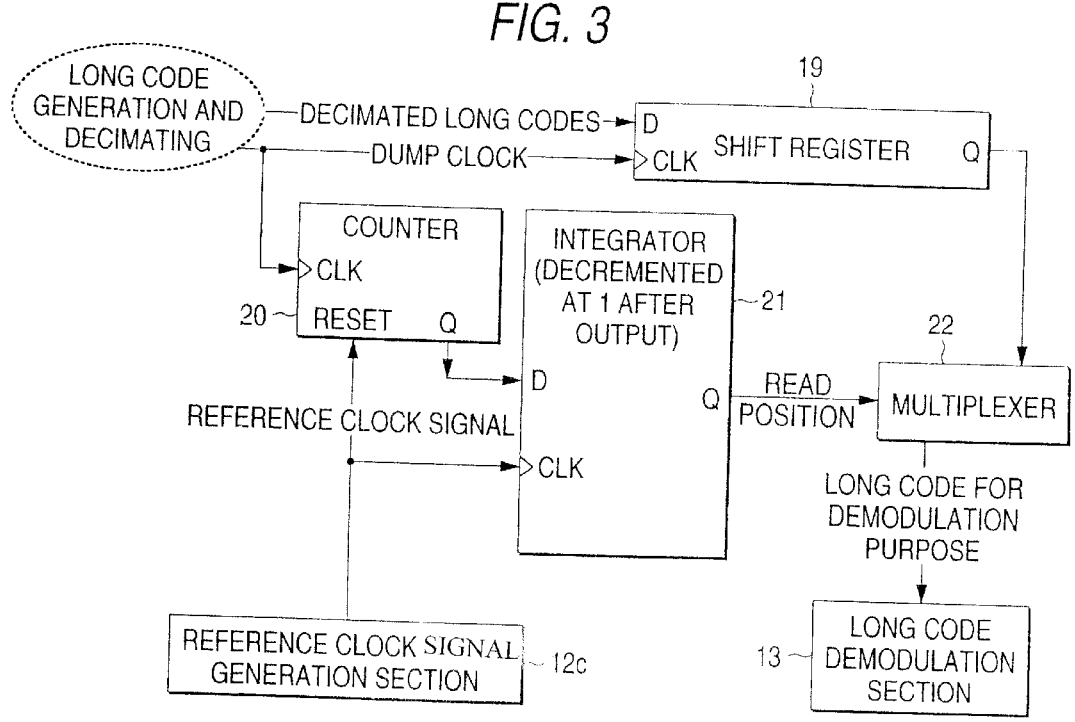
FIG. 3 is a block diagram showing the configuration of a second received long code generation section which more specifically embodies a received long code generation section according to a third embodiment of the present invention.

FIG. 3 shows the configuration of the second received long code generation section which more specifically embodies the received long code generation section 12 shown in FIG. 1. In FIG. 3, the second received long code generation section comprises a shift register 19 which stores the decimated received long codes while shifting them through use of the dump clock signal; a reference clock signal generator 12c for producing a reference clock signal; a counter 20 which is incremented by means of the dump clock signal and is reset by means of the reference clock signal; an integrator 21 which integrates an output from the counter 20, outputs a resultant integral value according to the reference clock signal, and is decremented after having output the integral value; and a multiplexer 22 which selects the received long code for the shift register from the position corresponding to an output from the integrator. In relation to the second received long code generation section, FIG. 3 also shows the received long code demodulation section 13 which demodulates a long code by processing the received symbol and the received long code through an XOR operation.

In the long code generation section having the foregoing configuration, the shift register 19 stores the received long code at every dump clock signal. Further, the counter 20 counts the number of dump clock signals for each reference clock cycle, and the value of the counter 20 is integrated by means of the integrator 21. The long codes are sequentially stored in the shift register 19. Since the reference clock signal is not synchronous with the dump clock signal, the read position is not necessarily incremented every reference clock cycle, and in some cases the read position may be skipped. To prevent this problem, the read position is calculated from an output from the counter when the long code is read from the shift register 19. After reading of the long code, the integral value is decremented, and the current position of the received long code to be read next time is taken as a read position. The received long code demodulation section 13 demodulates the long code read at the reference clock cycle by processing the received symbol and the despread received signal through an XOR operation.

Implementation of the received long code generation section involves eight flip-flops (shift registers), a three-bit counter, a three-bit adder (integrator), a switch for changing between −1 and an output from the counter, and a three-bit multiplexer for address decoder purpose (see Table 1 to be described later). The frequency cycle of the dump clock signal and that of the reference clock signal are 19.2 KHz. Therefore, compared with a CDMA mobile communications device using a long code generator, the CDMA mobile communications device according to the present invention can be made compact and can reduce an electric current to be dissipated.

Table 1 shows the configuration of the received long code generation section described in the second and third embodiments and the results of comparison between an existing CDMA mobile communications device using a long code generator and the CDMA mobile communications device according to the present invention. As material to be used for calculating the number of gates, MN7C000 series of CMOS standard cell (manufactured by Matsushita Electronics Industrial Co., Ltd.) are used

TABLE 1

| | SHIFT REGISTER | EXCLUSIVE OR | COUNTER | MULTIPLEXER | INTEGRATOR (ADDER) | REGISTER (DFF) | BI-DIRECTIONAL BUFFER | TOTAL NUMBER OF GATES |
|---|---|---|---|---|---|---|---|---|
| LONG CODE GENERATOR | 1 (42 cascaded registers) | | | | | | | 340 |
| RECEIVED LONG CODE GENERATION SECTION 1 | | | 2 (3bit) | 2 (3bit) (decoder) | | 1 (8bit) | 8 | 120 |
| RECEIVED LONG CODE GENERATION SECTION 2 | 1 (eight cascaded registers) | | 1 (3bit) | 1 (3bit) | 1 (3bit) | | | 108 |

As is obvious from Table 1, as a result of use of the received long code generation section according to the second and third embodiments of the present invention, the CDMA mobile communications device can be reduced to one-third of its original size.

Fourth Embodiment

Figure 4:
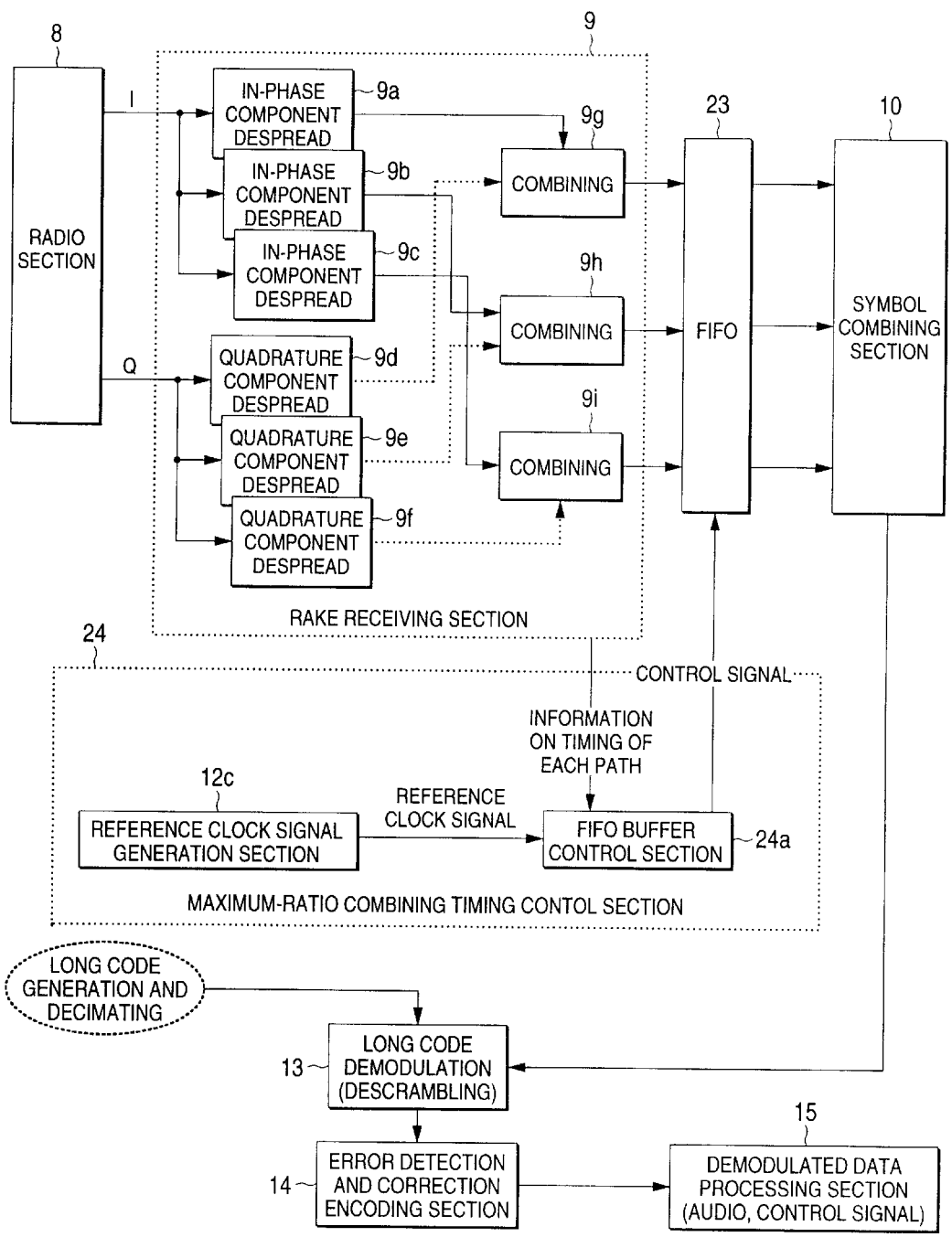
FIG. 4 is a block diagram showing the configuration of a CDMA mobile communications device according to a fourth embodiment of the present invention.

FIG. 4 is a block diagram showing the configuration of the receiving section of the CDMA mobile communications device according to a fourth embodiment of the present invention. In FIG. 4, the receiving section comprises a radio section 8; a RAKE receiving section 9; a buffer (FIFO) for storing a RAKE output (received symbol) for each path; a maximum-rate combining timing control section 24 which controls the read and write addresses of the FIFO buffer 23 and includes a reference clock signal generation section and a FIFO buffer control section; a symbol combining section 10 which combines a received symbol output from the FIFO buffer 23 and includes an adder; a long code demodulation section 13 which demodulates the received signal into a long code at the cycle of the frequency clock signal and includes an XOR processing section; an error detection and correction section 14 which reproduces received data by detection and correction of an error in the received symbol and includes a reverse interleaving section, a Viterbi decoder, and a CRC decoder; and a demodulated data processing section 15 which decomposes the demodulated data into audio and control signals and includes a header detection section and a frame decomposition section.

Figure 5:
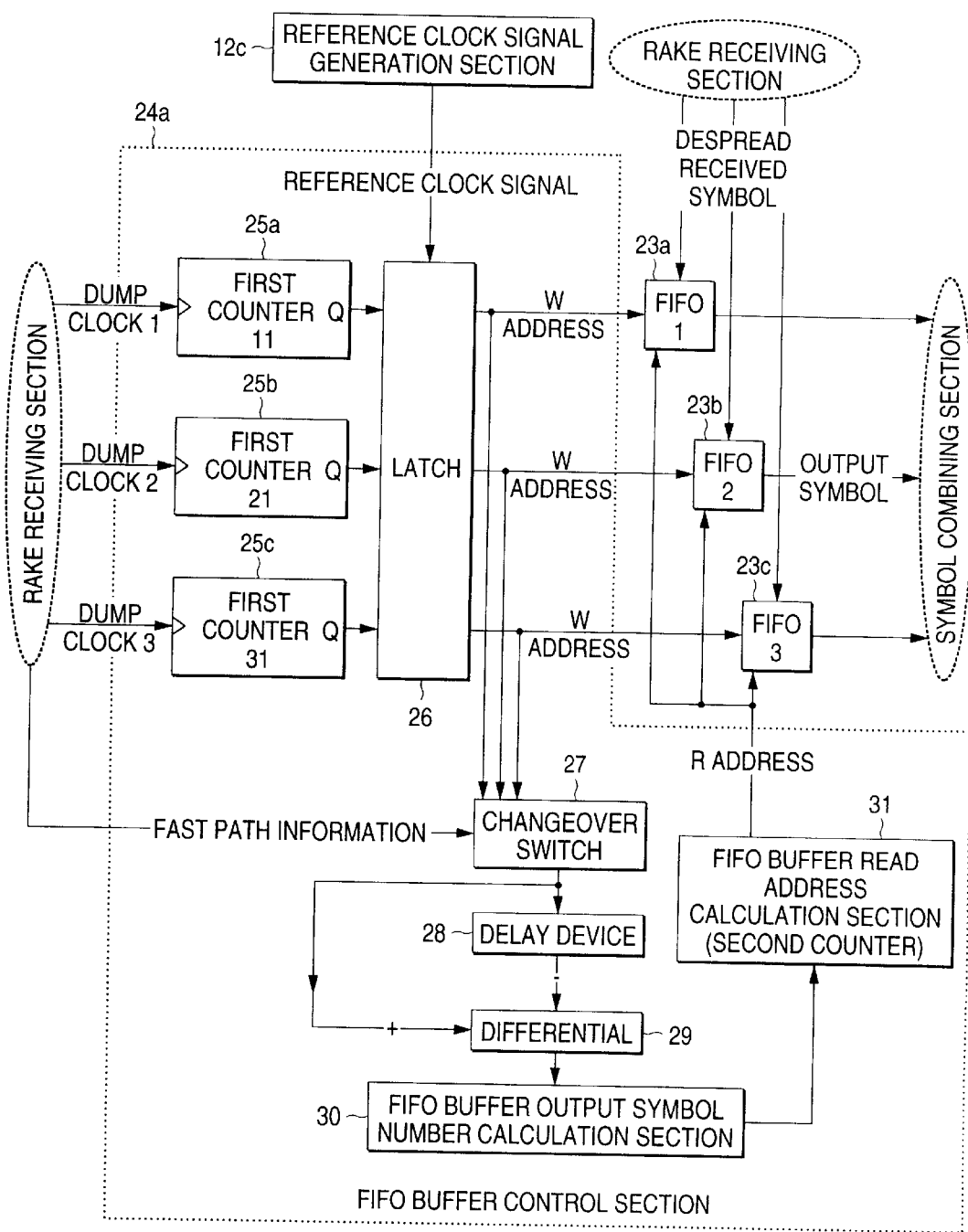
FIG. 5 is a block diagram showing the configuration of a maximum-rate combining timing control section according o the fourth embodiment.
Figure 6:
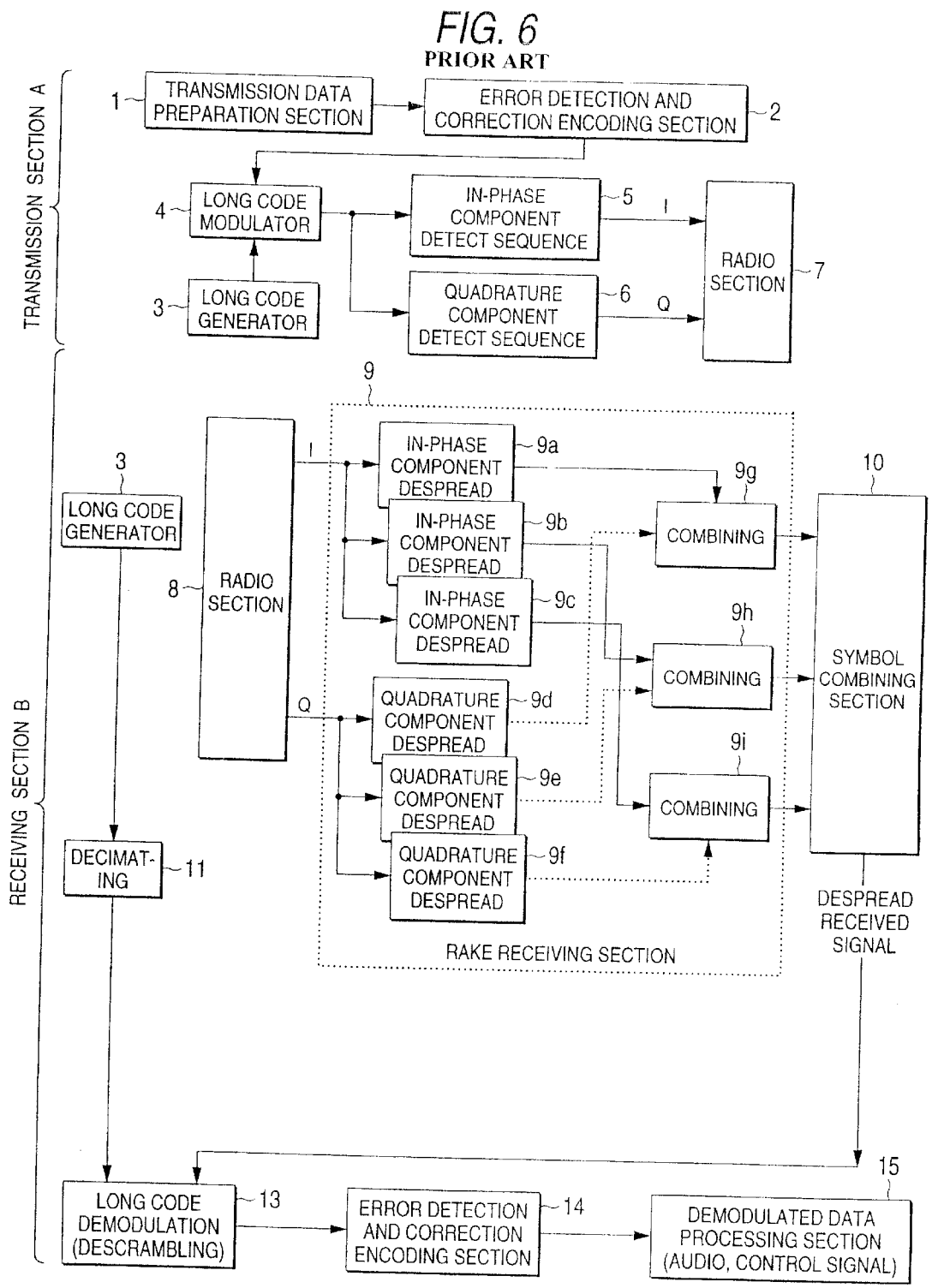
FIG. 6 is a block diagram showing the configuration of an existing North American CDMA mobile communications device.

An explanation will now be given of the control of the FIFO buffer of the receiving section in the CDMA mobile communications device according to the fourth embodiment of the present invention, by reference to FIG. 5. FIG. 5 is a block diagram showing the configuration of the maximum-rate combining timing control section comprising a FIFO buffer control section and a reference clock signal generation section. In relation to the FIFO buffer control section, FIFO buffers 23a to 23c are also shown in the drawing.

In FIG. 5, the maximum-rate combining timing control section comprises a FIFO buffer control section 24a and a reference clock signal generation section 12c. The FIFO buffer control section 23a comprises counters 25a to 25c (a plurality of first counters) for counting the output timing (or dump clock timing) of the relevant RAKE receiving section for each path; a latch 26 for latching an output from the counter through use of the reference clock signal; a changeover switch 27 which selects the symbol received over the fastest path from the output from the latch 26, by means of the information on the fastest path received from the relevant RAKE receiving section; a delay device 28 which delays the count value of the fastest path by a period of one reference symbol and includes a flip-flop; a differential signal generator 29 which produces a difference between the current count value of the fastest path and the count value delayed one reference clock signal and includes a subtractor; a FIFO buffer output symbol number calculation section 30 which calculates from the differential value the number of symbols output to the relevant symbol combining section from the FIFO buffer and includes an integrator; and FIFO buffer read address calculation section 31 which calculates read addresses of the FIFO buffers 23a to 23c from the number of symbols output from the FIFO buffer and includes a counter (second counter).

In the maximum-rate combining timing control section having the foregoing configuration, the (first) counter 25 for counting the dump clock signal has a modulo value equivalent to the maximum number of symbols (Nf) to be stored in the FIFO buffer. In the present example, 8 is taken as Nf. For example, if the maximum delay difference between paths is three symbols, the difference in count value between the fastest path and the slowest path is three (the fastest path>the slowest path). A received symbol is written into the relative write address of the FIFO buffer corresponding to the count value.

The reference clock signal is not synchronous with the dump clock signal, and hence the count value is steadily incremented at the time of a writing operation. However, in some cases, the incrementing operation may be skipped. In many cases, such a skip is attributable to variations in the cycle of the dump clock signal when the path is switched. In this case, the received symbol is also skipped, and the next symbol is stored. The symbol data received when the cycle of the dump clock signal is changed are scarcely reliable because of a change in despread cycle. Therefore, skipping the received symbol data does not impose any problem.

The calculation of the read address of the FIFO buffer will now be described. The difference in count value between the fastest path and the slowest path corresponds to several symbols (three symbols in this embodiment). A read address is calculated from a value (Nr) having at least a difference corresponding to the maximum number of allowable delay symbols (Ns) with reference to the count value of the fastest path. For example, the count value of the fastest path corresponds to five, Ns is 3, Nr 2. Nr is calculated through use of the delay device 28, the differential signal generator 29, and the FIFO buffer output symbol number calculation section 30. Although an output from the differential signal generator 29 is steadily one, the output may assume another value in the event of switching of the path.

For example, the output from the differential signal generator 29 assumes 2, the dump clock signal is dumped in a number corresponding to two clock components during the cycle of the reference clock signal. In this case, the number of symbols output from the FIFO buffer assumes two. The reason for this is that if there is no match between the number of symbols stored in the FIFO buffer and the number of symbols read from the FIFO buffer, the FIFO buffer causes an overflow. The FIFO buffer output symbol number calculation section 30 integrates an output from the differential signal generator 29 (because the number of data items to be stored in the FIFO buffer is finite). If a resultant integral value transcends a threshold value (i.e., the number of symbols corresponding to the maximum allowable delay time of the path), only an excess is taken as an output number. After the output, the integral value is decremented.

With such a configuration, in an initial state, the symbol received over the fastest path is stored in the FIFO buffer and is prevented from being output until the threshold value is output and the symbol received over the slowest path arrives at the communications device. Accordingly, symbols can be read after all the symbols have been stored in the FIFO buffer. In a steady state, since both the symbols received over the fastest path and the slowest path are stored in the FIFO buffer at every dump clock signal, they can be read from the FIFO buffer in a manner analogous to that mentioned above.

The FIFO buffer read address calculation section 31 controls the counter (i.e., the second counter) according to an output from the FIFO buffer output symbol number calculation section 30. The received symbol is read from the FIFO buffers 23a to 23c through use of the relative read addresses corresponding to the count value of the counter. Every time the symbol is read, the (second) counter is incremented. (The second counter used in this embodiment is reset at modulo 8, and hence an identical count value corresponding to the relative read address is shared among the paths)

As mentioned above, even in the event of a delay difference spreading over several symbols, the symbols received over the paths can be combined without involvement of phase shift.

Although the foregoing explanation has chiefly described the example of the CDMA mobile communications device, it goes without saying that the present invention can be applied to a receiver of a base station.

As has been described above, according to the present invention, a long code modulation operation is performed on the basis of the long code (received long code) output from the buffer at the cycle of a reference clock signal and a signal (received symbol) formed by combining of the received signals output from the RAKE receiving section, through use of a buffer which decimates the output from the long code generator of the transmission section and stores the thus-removed long codes, a buffer control section which controls read and write addresses of the buffer, and a reference clock signal generator for producing a clock signal which runs at the cycle of the received symbol. As a result, the necessity of providing the receiving section with a long code generator is eliminated, thus rendering a mobile communications device and reducing an electric current to be dissipated.

Input and output of the received long code can be controlled with a simple configuration by, every dump clock signal, storing a received long code in a relative address position corresponding to a value of a first count value and by, at the cycle of the reference clock signal, reading the received long code from the relative address position of a FIFO buffer corresponding to a value of a second counter, through use of a first-in-first-out (FIFO) buffer which stores the received long code, a first counter which counts an output timing (or the dump clock signal) of the demimating section and has a cycle corresponding to the capacity of the FIFO buffer, and a second counter which is incremented at the cycle of the reference clock signal and has a cycle corresponding to the capacity of the FIFO buffer.

Similarly, input and output of the received long code can be controlled with a simple configuration by reading the received long code from the position of the shift register corresponding to an output from an integrator, through use of a shift register which stores the received long code while shifting the long code at each output timing of the decimating section, a counter which is incremented at every dump clock timing and is reset by means of the reference clock signal, and an integrator which integrates the count value, outputs an integral value every reference clock signal, and is decremented after outputting of the integral value.

Symbols received over paths which have a delay difference spreading over several symbols can be combined without involvement of phase shift, by means of a first-in-first-out (FIFO) buffer which stores an output (received symbol) from the RAKE receiving section for each path, a first counter which is incremented every output timing (or dump clock timing) for each path of the RAKE receiving section and whose maximum value is equal to the maximum number of symbols to be stored in the FIFO buffer, a reference clock signal generation section for outputting a clock (reference clock) signal which runs at the cycle of the received symbol, a second counter which is referred to as a relative read address of the FIFO buffer and whose maximum value is equal to the maximum number of symbols to be stored in the FIFO buffer, and a buffer control section which stores the received symbol at every reference clock signal by reference to an output from the first counter as a write address and which referrers to an output from the second counter (an identical count value is shared among the paths) as the read address of each FIFO buffer.

What is claimed is:

1. A CDMA mobile communications device comprising:
   a transmission section including:
     a transmission data preparation section,
     an encoding section for detecting and correcting an error,
     a long cycle string code (long code) generator used for primary spreading operations,
     a long code modulator which processes the long code and an output from the encoding section by means of an exclusive OR operation;
     a short code spreader which divides an output from the long code modulator into in-phase components and quadrature components and processes the components by means of secondary spread through use of a short cycle string code (short code),
     a frequency conversion section which converts the frequency of an output from the short code spreader into a radio frequency range,
     an amplifier for amplifying the thus-frequency-converted signal, and
     an antenna; and
   a receiving section including:
     a radio receiving section for converting a signal received by an antenna into a signal of base band range, a RAKE receiving section which separates an output from the radio receiving section for each transmission path and despreads the thus-separated outputs for each in-phase component and for each quadrature component by means of despreading operations through use of the short code, a symbol combining section which combines outputs from the RAKE receiving section, a buffer which decimates the output from the long code generator of the transmission section and stores the thus-removed long codes, a buffer control section which controls read and write addresses of the buffer, a long code demodulator which processes the long code (received long code) output from the buffer and the received signal (received symbol) output from the symbol combining section by means of exclusive OR operations, a reference clock signal generator for producing a clock signal which runs at the cycle of the received symbol, an error detection-and-correction section which reproduces received data by detection and correction of an error in the symbol output from the long code demodulator, and a demodulated data processing section which decomposes the reproduced data into a sound signal and a control signal.

2. The CDMA mobile communications device as defined in claim 1, wherein the buffer previously stores the received long code in at least a number corresponding to the maximum amount of delay before a transmission timing of the transmission section lags.

3. A CDMA mobile communications device comprising:

a long cycle string code (long code) generator to be used in primary spreading operations for transmission;

a decimating section for decimating an output from the long code generator;

a first-in-first-out (FIFO) buffer for storing an output (received long code) from the decimating section;

a reference clock signal generator for producing a clock (reference clock) signal which runs at the cycle of a despread received signal (received symbol);

a first counter which is incremented at an output timing (or dump clock timing) of the decimating section;

a second counter which is incremented at the reference clock signal; and a long code operation which processes the received long code output from the FIFO buffer and the despread received signal.

4. The CDMA mobile communications device as defined in claim 3, wherein modulo values of the first and second counters are taken as the maximum number of long codes which the FIFO buffer can store, and wherein the output from the first counter is referred to as a write address of the FIFO buffer every output timing (dump clock timing), and the output from the second counter is referred to as a read address of the FIFO buffer every reference clock signal.

5. A CDMA mobile communications device comprising:

a long cycle string code (long code) generator to be used in primary spreading operations for transmission;

a reference clock signal generator for producing a clock (reference clock) signal which runs at the cycle of a despread received signal (received symbol);

a decimating section for decimating an output from the long code generator;

a shift register which stores the long code (received long code) while shifting the long code each timing (dump clock timing) at which the decimating section produces an output;

a counter which is incremented at every dump clock timing and is reset at the reference clock signal;

an integrator which integrates the count value, outputs an integral value, and is decremented after outputting of the integral value; and a long code operation which reads the received long code of the shift register from the position corresponding to the value output from the integrator and processes the read received long code and the despread received signal by means of exclusive OR operations.

6. A CDMA mobile communications device comprising:

a radio receiving section for converting a signal received by an antenna into a signal of base band range;

a RAKE receiving section which separates an output from the radio receiving section for each transmission path and despreads the thus-separated outputs for each in-phase component and for each quadrature component by means of despreading operations through use of the short code;

a plurality of buffers which store outputs from the RAKE receiving section for respective paths;

a symbol combining section which combines outputs from the buffers;

a buffer control section which calculates write and addresses of each buffer on the basis of information about the timing of the signal for each path received from the RAKE receiving section in order to prevent phase shift among the outputs from the buffers at the time of combining of a symbol;

a long cycle string code (long code) generator;

a decimating section which decimates an output from the long code generator;

a long code demodulator which processes an output (received long code) from the decimating section and an output (received symbol) output from the symbol combining section by means of exclusive OR operations;

an error detection-and-correction section which reproduces received data by detection and correction of an error in the symbol output from the long code demodulator; and a demodulated data processing section which decomposes the reproduced data into a sound signal and a control signal.

7. The CDMA mobile communications device as defined in claim 6, wherein the plurality of buffers comprise a plurality of first-in-first-out (FIFO) buffers which store outputs (received symbols) from the RAKE receiving section for each of the paths; and wherein the buffer control section comprises a plurality of first counters which are incremented at every output timing (dump clock timing) for each of the paths of the RAKE receiving section and whose maximum value is equivalent to the maximum number of received symbols to be stored in each FIFO buffer;

a reference clock signal generator for producing a clock (reference clock) signal running at the cycle of the received symbol;

a second counter which is referred to as a relative address of each FIFO buffer and whose maximum value is equal to the maximum number of symbols to be stored in each FIFO buffer; and a FIFO buffer control section which stores received symbols into the individual FIFO buffers while, for every reference clock signal, referring to outputs from the plurality of first counters as write addresses and which refers to all the relative read addresses of the FIFO buffers as an identical count value of the second counter.

8. The CDMA mobile communications device as defined in claim 6, wherein the FIFO buffer control section comprises:

a switch for selecting a count value (the fastest count value) corresponding to the fastest path (a receiving path over which a signal arrives at the fastest speed);

a delay device which delays the fastest count value for one cycle of the reference clock signal;

a differential signal generator which produces a signal relating to a difference between the output from the switch and the output from the delay device;

a FIFO buffer output symbol number calculation section which calculates from the output from the differential signal generator the number of symbols output from each FIFO buffer; and a FIFO buffer read address calculation section for incrementing the count value of the second counter referred to at the time of calculation of the read address, after each FIFO buffer has been read.

9. A CDMA mobile communications base station comprising:

a transmission section including:
  a transmission data preparation section,
  an encoding section for detecting and correcting an error,
  a long code generator used for primary spreading operations,
  a long code modulator which processes the long code and an output from the encoding section by means of an exclusive OR operation;
  a short code spreader which divides an output from the long code modulator into in-phase components and quadrature components and processes the components by means of secondary spread through use of a short code,
  a frequency conversion section which converts the frequency of an output from the short code spreader into a radio frequency range,
  an amplifier for amplifying the thus-frequency-converted signal, and
  an antenna; and a receiving section including:
  a radio receiving section for converting a signal received by an antenna into a signal of base band range,
  a RAKE receiving section which separates an output from the radio receiving section for each transmission path and despreads the thus-separated outputs for each in-phase component and for each quadrature component by means of despreading operations through use of the short code,
  a symbol combining section which combines outputs from the RAKE receiving section,
  a buffer which decimates the output from the long code generator of the transmission section and stores the thus-removed long codes,
  a buffer control section which controls read and write addresses of the buffer,
  a long code demodulator which processes the long code (received long code) output from the buffer and the received signal (received symbol) output from the symbol combining section by means of exclusive OR operations,
  a reference clock signal generator for producing a clock signal which runs at the cycle of the received symbol,
  an error detection-and-correction section which reproduces received data by detection and correction of an error in the symbol output from the long code demodulator, and
  a demodulated data processing section which decomposes the reproduced data into a sound signal and a control signal.

10. The CDMA mobile communications base station as defined in claim 9, wherein the buffer previously stores the received long code in at least a number corresponding to the maximum amount of delay before a transmission timing of the transmission section lags.

11. A CDMA mobile communications base station comprising:

a long code generator to be used in primary spreading operations for transmission;

a decimating section for decimating an output from the long code generator;

a first-in-first-out (FIFO) buffer for storing an output (received long code) from the decimating section;

a reference clock signal generator for producing a clock (reference clock) signal which runs at the cycle of a despread received signal (received symbol);

a first counter which is incremented at an output timing of the decimating section;

a second counter which is incremented at the reference clock signal; and long code operation which processes the received long code output from the FIFO buffer and the despread received signal.

12. The CDMA mobile communications base station as defined in claim 11, wherein modulo values of the first and second counters are taken as the maximum number of long codes which the FIFO buffer can store, and wherein the output from the first counter is referred to as a write address of the FIFO buffer every output timing, and the output from the second counter is referred to as a read address of the FIFO buffer every reference clock signal.

13. A CDMA mobile communications base station comprising:

a long code generator to be used in primary spreading operations for transmission;

a reference clock signal generator for producing a clock (reference clock) signal which runs at the cycle of a despread received signal (received symbol);

a decimating section for decimating an output from the long code generator;

a shift register which stores the long code (received long code) while shifting the long code each timing at which the decimating section produces an output;

a counter which is incremented at every reference clock signal;

an integrator which integrates the count value, outputs an integral value, and is decremented after outputting of the integral value; and a long code operation which reads the received long-code of the shift register from the position corresponding to the value output from the integrator and processes the read received long code and a despread received signal by means of exclusive OR operations.

14. A CDMA mobile communications base station comprising:

a radio receiving section for converting a signal received by an antenna into a signal of base band range;

a RAKE receiving section which separates an output from the radio receiving section for each transmission path and despreads the thus-separated outputs for each in-phase component and for each quadrature component by means of despreading operations through use of the short code;

a plurality of buffers which store outputs from the RAKE receiving section for respective paths;

a symbol combining section which combines outputs from the buffers;

a buffer control section which calculates write and addresses of each buffer on the basis of information about the timing of the signal for each path received from the RAKE receiving section in order to prevent phase shift among the outputs from the buffers at the time of combining of a symbol;

a long code generator;

a decimating section which decimates an output from the long code generator;

a long code demodulator which processes an output (received long code) from the decimating section and an output (received symbol) output from the symbol combining section by means of exclusive OR operations;

an error detection-and-correction section which reproduces received data by detection and correction of an error in the symbol output from the long code demodulator; and a demodulated data processing section which decomposes the reproduced data into a sound signal and a control signal.

15. The CDMA mobile communications base station as defined in claim 14, wherein the plurality of buffers comprise a plurality of first-in-first-out (FIFO) buffers which store outputs (received symbols) from the RAKE receiving section for each of the paths; and wherein the buffer control section comprises a plurality of first counters which are incremented at every output timing for each of the paths of the RAKE receiving section and whose maximum value is equivalent to the maximum number of received symbols to be stored in each FIFO buffer;

a reference clock signal generator for producing a clock (reference clock) signal running at the cycle of the received symbol;

a second counter which is referred to as a relative address of each FIFO buffer and whose maximum value is equal to the maximum number of symbols to be stored in each FIFO buffer; and a FIFO buffer control section which stores received symbols into the individual FIFO buffers while, for every reference clock signal, referring to outputs from the plurality of first counters as write addresses and which refers to all the relative read addresses of the FIFO buffers as an identical count value of the second counter.

16. The CDMA mobile communications base station as defined in claim 14, wherein the FIFO buffer control section comprises:

a switch for selecting a count value (the fastest count value) corresponding to the fastest path (a receiving path over which a signal arrives at the fastest speed);

a delay device which delays the fastest count value for one cycle of the reference clock signal;

a differential signal generator which produces a signal relating to a difference between the output from the switch and the output from the delay device;

a FIFO buffer output symbol number calculation section which calculates from the output from the differential signal generator the number of symbols output from each FIFO buffer; and a FIFO buffer read address calculation section for incrementing the count value of the second counter referred to at the time of calculation of the read address, after each FIFO buffer has been read.

17. A CDMA receiving method comprising the steps of:

decimating an output from a transmission long code generator, wherein the decimated output is a decimated long code, and storing the decimated long code as a received long code; and demodulating the received long code stored at the cycle of a reference clock signal and a signal (received symbol) formed by combining of RAKED signals received over multiple paths, by means of an exclusive OR operation.

* * * * *